March 6, 1951     M. WAGNER     2,544,115
LEAKPROOF BATTERY
Filed Dec. 22, 1945
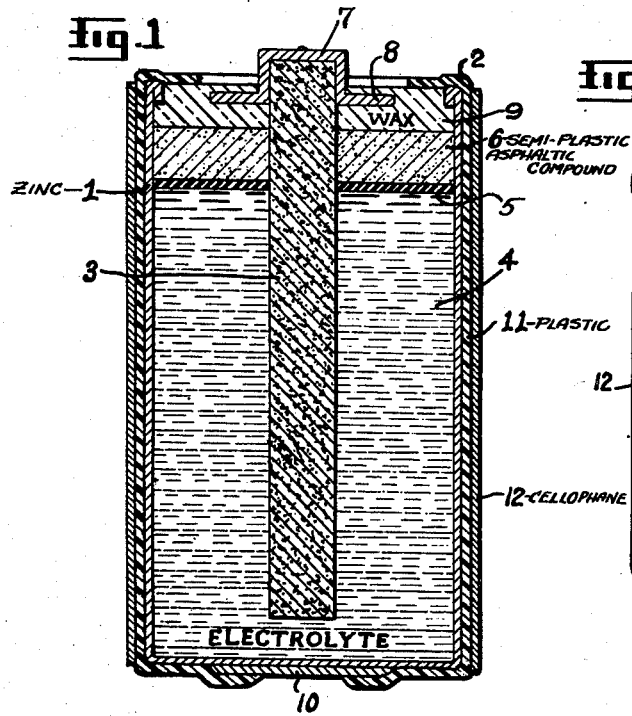
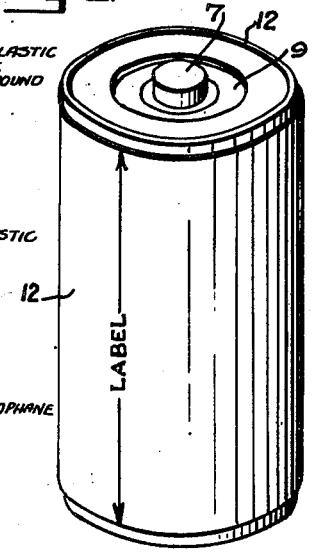
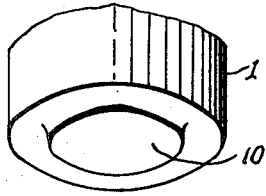
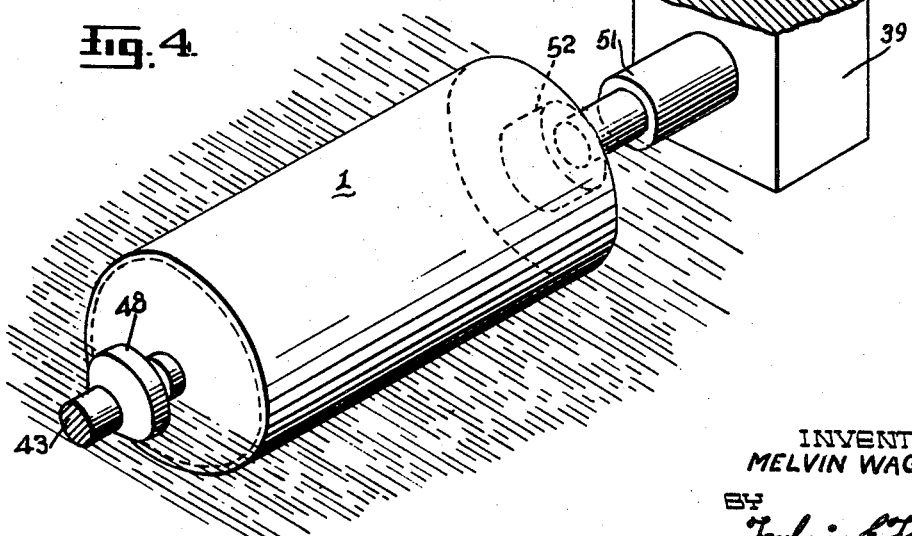
INVENTOR
MELVIN WAGNER,
BY
Toulmin & Toulmin
ATTORNEYS Patented Mar. 6, 1951

2,544,115

UNITED STATES PATENT OFFICE 2,544,115

LEAKPROOF BATTERY

Melvin Wagner, Glenside, Pa., assignor to Glenside Bag Company, Glenside, Pa., a partnership consisting of Arthur Vane Holloway and Melvin Wagner Application December 22, 1945, Serial No. 636,750

3 Claims. (Cl. 136—133)

The present invention relates to electric batteries, more especially to those of the dry cell type, and their mode of manufacture.

The batteries on the present-day market are, for the most part, subject to the objection that the electrolyte attacks the container where there are foreign bodies in the zinc and may render the battery useless. The bottom of the container is particularly susceptible to the effects of such attacks because it is ordinarily difficult to apply a protective coat to this surface. In accordance with one aspect of my invention, the bottom of the battery is made of a double metal layer so that any weakening of the can at this position is resisted by the extra metal layer.

Another object is to provide an improved battery construction in which there are no exposed joints and the outer surface of the battery container is rendered continuously and completely electrolyte proof. This object is attained in brief by applying to the exterior surface of the battery an acid and alkali resistant, also an air and moisture resistant material which covers the entire peripheral surface of the battery, in addition to a considerable portion of the top and bottom surfaces.

The invention will be better understood when the specification is perused in connection with the accompanying drawings, in which:

Figure 1 represents a vertical sectional view of the improved dry cell or battery.

Figure 2 is a perspective view of the finished cell and showing the application of a label.

Figure 3 is a perspective view of the bottom portion of the battery illustrating the reenforcing metal layer.

Figure 4 is a partially perspective and partly diagrammatic view depicting the manner in which the peripheral-extending coating is automatically applied.

Referring more particularly to Figures 1 to 3, reference character 1 designates a cylindrical casing made preferably of zinc and closed at the bottom. The top of the casing is bent over inwardly, as indicated at 2, to form a rounded flange or thickened portion. There is a carbon rod electrode, indicated at 3, extending along the central axis of the battery to constitute the negative electrode so that the zinc container comprises the positive electrode. The annular space between the central carbon element and the interior of the zinc container is filled with a semi-fluid electrolyte 4 of the usual type.

An asphalt impregnated paper disc 5 provided with a central opening fits tightly over the carbon rod or core and within the casing, this disc being placed directly on top of the electrolyte body. A semi-plastic asphaltic compound 6 is then poured on top of the spacing or disc 5. This compound may, if desired, be whipped with air to provide a cushion so that when hydrogen gas is formed within the cell, the entrained air is compressed slightly before the battery bulges. The asphaltic compound, in general, fills approximately one-half the space between the disc 5 and the top of the can or container 1.

A brass cap 7 is secured in any suitable manner to the top of the carbon core, this cap fitting the carbon core tightly and extending downwardly to provide flanges 8. The core 3 extends to a height somewhat greater than the top of the can and the flange 8 will be positioned a short distance above the top surface of the compound 6. Hot sealing wax, indicated at 9, is poured on top of the compound 6 and around the flange 8, the upper surface of the wax being about in line with the top edge of the can.

It has been found that when a battery of the type described is kept in fairly continuous operation, all portions of the zinc container are susceptible to corrosion, but the portion which gives the greatest difficulty in this connection is the bottom surface. The container may be weakened or actually have a hole formed therein at this point. The electrolyte escaping through the opening, not only causes the battery to deteriorate and to short circuit adjacent batteries, but in the case of flashlights, the interior of the casing is fouled. In accordance with one aspect of my invention, the inevitable result of the corroding effect is eliminated by providing an extra thickness of metal at the bottom surface, and also a protective layer of plastic material over the side surfaces of the battery.

As shown in the drawings, a reenforcing plate 10 preferably of solder is secured in any suitable manner to the external surface of the bottom of the can, this plate being preferably of circular configuration and having a size considerably larger than the size of the core. In order to provide the plate or extra metal thickness, the zinc container can either be so drawn that this thickness of metal is left at the base or the container can be dipped in solder at the bottom to pick up the necessary additional protective metal coating. Thus, when the electrolyte has eaten through the zinc at the bottom of the cell, it can go no further on account of the presence of the solder layer.

In carrying out my invention, I employ a battery casing 1 of drawn metal so as to eliminate any joint between the bottom and side portions. The entire outer surface of the battery including the bottom and top is coated with an acid and alkali resistant material 11 which may be applied as hot material or with solvents. This material can be conveniently applied by rotating the battery around its longitudinal axis through a bath of the material as will be explained presently.

Usually, four revolutions of the battery within the bath will be sufficient and the arrangement is such that the coating 11 will lap over the ends of the battery, as shown, to a distance, preferably not greater than one-third of the diameter of the battery. The plastic coating 11 may be of any suitable type as will provide moisture-proofing, waterproofing and leak-proofing. Such a material may comprise a modified ethyl cellulose, urea formaldehyde, acrylates and methacrylates, polythenes, polystyrenes and any other combinations of these materials together with suitable and well-known plasticizers and wetting agents as will provide the type of protection necessary.

After the coating has been applied, the battery may then be wrapped in some sort of wrapper, cellophane or foil label 12 of any suitable and well-known type and the label can be pasted to the plastic coating, if desired. In the case of a cellophane wrapper or label, the latter can be reversed-printed, thus increasing the sheen, etc. It is also possible to use a foil covered paper as label material. It is apparent that the wrapping of a label around the outside of the coating 11 serves to provide printing space, also protects the plastic coating from injury.

It is apparent that the improved method of sealing with an asphaltic compound is not limited to batteries but is equally applicable to hermetically covering any form of container which involves joined parts, such as corked or capped bottles, cardboard salt boxes, etc.

While the construction disclosed and described herein constitutes a preferred form of the invention, it will be understood that the structure is capable of alteration without departing from the spirit of the invention, and that all modifications that fall within the scope of the appended claims are intended to be included herein.

Having thus fully described my invention, what I claim as new and desire to secure by Letters Patent, is:

1. A dry cell comprising a metal container closed at one end by an integral bottom piece, an additional outer layer of metal on the bottom of the container, an electrolyte within the container and a centrally disposed carbon core extending through the electrolyte, the annular opening between the core and container being closed by a semi-plastic asphaltic compound containing entrained air, and a plastic coating over the entire circumferential surface of the battery and also over an appreciable portion of each end of the battery.

2. A dry cell comprising a metal container having an integral bottom portion, a centrally disposed core within the container, an electrolyte between the core and the container, the upper portion of the container being closed by an insulating compound to hold the carbon core in position, said compound including bubbles of entrained air, and a plastic coating extending over the entire circumferential surface of the battery and also over limited portions of the ends of the battery.

3. A dry cell comprising a zinc container closed at the bottom by an integral portion, a centrally disposed electrode in the container, an electrolyte between said electrode and the container, the top portion of the container being closed by an asphaltic impregnated paper spacer, a layer of semi-plastic asphaltic compound supported by said spacer and including entrained air bubbles, and a layer of sealing wax on said compound.

MELVIN WAGNER.

REFERENCES CITED

The following references are of record in the file of this patent:

UNITED STATES PATENTS

| Number | Name | Date |
|---|---|---|
| 1,196,999 | White | Sept. 5, 1916 |
| 1,331,764 | Hazelett | Feb. 24, 1920 |
| 1,472,359 | Finkeldey et al. | Oct. 30, 1923 |
| 1,490,455 | Combs | Apr. 15, 1924 |
| 1,702,473 | Heise et al. | Feb. 19, 1929 |
| 2,169,805 | Kronquest | Aug. 15, 1939 |
| 2,175,686 | Eddy | Oct. 10, 1939 |
| 2,212,234 | Henderson | Aug. 20, 1940 |
| 2,346,640 | Anthony | Apr. 18, 1944 |
| 2,352,759 | Baum | July 4, 1944 |
| 2,396,693 | Glover | Mar. 19, 1946 |
| 2,411,272 | Keller | Nov. 19, 1946 |
| 2,450,813 | Reinhardt et al. | Oct. 5, 1948 |

FOREIGN PATENTS

| Number | Country | Date |
|---|---|---|
| 364,240 | Great Britain | Jan. 7, 1932 |